United States Patent Office 3,468,725

Patented Sept. 23, 1969

3,468,725

PROCESS FOR THE PREPARATION OF PLANOGRAPHIC PRINTING PLATES

Fritz Uhlig, Wiesbaden-Biebrich, Germany, assignor to Kalle Aktiengesellschaft, Wiesbaden-Biebrich, Germany, a corporation of Germany No Drawing. Filed May 31, 1966, Ser. No. 553,729

Claims priority, application Germany, June 3, 1965, K 56,297

Int. Cl. C23f *7/00;* B41n *1/00, 3/00*

U.S. Cl. 148—6.15 3 Claims

ABSTRACT OF THE DISCLOSURE

In the process for making a light-sensitive printing plate having a first layer of a water-soluble organic phosphonic substance on an aluminum support and a light-sensitive second layer on the first layer, the improvement in which the support is stored, after the application of the first layer and before the application of the second layer, for more than 24 hours and washed with water after storage and before the application of the second layer until any water-soluble portion of the first layer is thoroughly washed off the aluminum support.

This invention relates to a process for the preparation of planographic printing plates wherein factory-prepared support material is not provided with a light-sensitive reproduction coating but this is effected by the consumer. The invention furthermore relates to a support material which produces particularly preferred results in the process.

Planographic printing plates are marketed on a large scale as presensitized planographic printing plates. As a rule, they consist of a support having a hydrophilic surface and a light-sensitive reproduction coating thereon. Positive and negative working reproduction coatings are known.

As support material, aluminum is preferably employed, the surface of which was rendered hydrophilic by suitable pretreatment. Besides this, however, planographic printing plates are prepared on a large scale by "self-coating," i.e., as so-called "wipe-on" or "do-it-yourself" plates. Here the hydrophilic support and the copying material, generally as copying lacquer, are marketed separately; the planographic printing plate is prepared by the user shortly before use.

That this process is of significance, despite the obvious convenience in the use of presensitized planographic printing plates, is principally attributable to the fact that, under certain storage conditions, the reproduction coatings of the presensitized planographic printing plates are subject to a constantly progressive decomposition. Particularly unfavorable are conditions of high atmospheric humidity and relatively high temperature such as occur especially in tropical areas. There, planographic printing plates are prepared chiefly by self-coating. This process, too, however has a pronounced difficulty. The hydrophilic properties of the support material, generally pretreated aluminum, diminish unforeseeably in the course of time so that plates ready for printing are no longer sufficiently water-accepting in the non-image areas. Efforts have been made to overcome this disadvantage by roughening the surface of the aluminum, electrolytically or mechanically or by treating it with silicates, but these support materials also have, as a rule, only limited shelf life and after only a few weeks exhibit a decrease in hydrophilic properties. Moreover, these plates have the disadvantage that only a few reproduction coatings (negative-working light-sensitive coatings only) will adhere to them.

Among the aforementioned presensitized planographic printing plates, a planographic printing plate is known in which, between the aluminum support and the reproduction coating, there is a thin layer which consists wholly or in part of at least one phosphonic acid and/or derivative thereof. This intermediate layer causes excellent adhesion of negative-working as well as positive-working reproduction coatings. It is eminently hydrophilic and, as has been found in connection with the present invention, the portion of the layer which causes adhesion can not be washed off with water. The intermediate layer is produced on the aluminum by immersion, coating, wiping or whirl-coating the aluminum in, or with, a solution of a phosphonic acid. In the known process of coating planographic aluminum foils with a phosphonic acid, the coating conditions are selected such that as good an adhesion as possible is achieved, and best process conditions result in the formation of a phosphonic acid layer which adheres firmly to the aluminum and cannot be washed off. The copying material is then coated thereon. The composition and preparation of this copying material are described in U.S. Patent No. 3,220,832.

It has now been found that planographic printing plates of the composition described above, i.e. aluminum as a support material, phosphonic acid as an intermediate layer, and light-sensitive material as a covering coating, also can be produced, in outstanding quality, by self-coating when a support is used which bears a thin layer of a phosphonic acid. In this process the support is, in the course of manufacture, provided on one or on both sides with a layer of a phosphonic acid, fabricated in the form required by the consumer, in particular cut into sizes, then shipped and/or stored, in general for more than 24 hours, and not coated with the light-sensitive material, on one or both sides, until this is effected by the consumer shortly before the plate is used. Even after a lengthy storage, i.e. of 6 months or more, no difficulties occur in regard to the hydrophilic properties of the surface of the support. A particularly effective method of working is to use a support material which bears, on one or on both sides, a phosphonic acid layer which contains, in addition to a water-insoluble portion adhering firmly to the aluminum, a portion capable of being washed off with water.

This material also is included in the present invention. The portion capable of being removed with water must be washed off before coating is effected, since it considerably impairs the adhesion of the light-sensitive layer. Further, by washing, dust particles on the support material are washed away with the portion of the phosphonic acid layer which is capable of being washed off with water. The reproduction coating applied by the consumer, provided that the work has been carried out properly, is practically completely free from troublesome spots or holes.

It is believed that the hydrophilic properties of the aluminum, coated with phosphonic acid, are retained for some years, so that sensitizing of the support material by the consumer still can be effected even after lengthy storage.

This property of the aluminum coated with phosphonic acid is surprising to one skilled in the art, since all hitherto known treatments of the aluminum to render it hydrophilic have led only to hydrophilic properties of limited duration in cases where the support material was exposed to the air. Even the good hydrophilic properties of a processed, suitably presensitized planographic printing plate could not show this property, since a hydrophilic aluminum surface provided with a lightsensitive coating does, as a rule, retain its hydrophilic properties for a very long time, because the air does not have direct access to the hydrophilic coating.

The surprising property of the material according to the invention is that the very thin phosphonic acid layer, which is capable of being washed off still can be washed off after a long time and does not react with the aluminum. Closer investigations of this peculiar behavior showed that the situation probably is as follows:

The firmly adhering intermediate layer which was freed from phosphonic acid capable of being washed off is a few molecular layers thick. It adheres very firmly to the aluminum by adsorptive and chemical forces. The layer capable of being washed off is also adsorptively attached, but by substantially weaker forces. Altogether, about 20 layers of molecules are attached by the adsorptive forces, as was found analytically by evaluation of absorption isotherms. Of these layers, about the first three are attached firmly, while the remaining layers can be washed off with water. In the wash water, the phosphonic acid is detectable, but this analysis requires high accuracy because of the small amount of phosphonic acid washed off. Whether a phosphonic acid layer contains a portion capable of being washed off can be determined much more simply by a practical test:

The layer is exposed for a time to the action of dust and then washed with water. If the dust is washed off properly, the layer contains a phosphonic acid portion which is capable of being washed off. If the dust does not wash off properly, only the first, firmly adhering layers were present.

The preparation of the support material according to the present invention is effected in the same manner as described in the aforesaid U.S. Patent No. 3,220,832. However, in order not to produce the layer which results when following the intentions of the above U.S. patent and which, as has now been found, essentially consists merely of a portion which adheres firmly and is not capable of being washed off, a somewhat higher concentration of dissolved phosphonic acid must be applied than was necessary for maximum results in the process of the aforementioned U.S. patent. As an example, however, it is also possible to produce in a first operation, by working in accordance with the procedure described in the above U.S. patent, essentially a firmly adhering layer, and then, in a second operation, a layer essentially capable of being washed off. General rules, when also the layer capable of being washed off, and when only the layer which can not be washed off, is formed, can not be stated. It is, therefore, expedient to ascertain in the manner described above, whether the layer capable of being washed off has already formed and to adjust the production conditions accordingly.

As phosphonic acids with which the coating may be formed, organic phosphonic acids and derivatives thereof in the widest sense are useful, such as aromatic, substituted aromatic, substituted and unsubstituted, saturated and unsaturated, cyclic, aliphatic, heterocyclic, and substituted heterocyclic phosphonic acids, and also the polymers and copolymers of unsaturated phosphonic acids with each other or with other vinyl compounds, as well as derivatives thereof, such as salts or esters. Especially preferred is the use of polyvinylphosphonic acid.

U.S. Patent No. 3,220,832 discloses the use of vinyl phosphonic acid, polyvinylphosphonic acid, 2-phosphono-ethane-1-sulfonic acid, vinyl phosphonic acid monomethyl ester, vinyl phosphonic ethyl ester, 4-chlorophenyl phosphonic acid, 4-chloro-3-nitro-phenyl phosphonic acid, 5-nitronaphthalene phosphonic acid, interpolymers of vinyl phosphonic acid and acrylic acid or vinyl acetate and salts of said phosphonic acids.

The performance of the process according to the invention, as well as the use of the support material according to the invention, is effected in the manner usual in the self-coating of planographic printing plates. Commercial aluminum, particularly in the form of plates or strips, is treated with a phosphonic acid solution according to known methods for the preparation of coatings. Optionally, the aluminum may be subjected to pre-cleaning before the treatment with phosphonic acid; the preliminary cleaning may be chemical or electrolytic. The aluminum is then immersed in a cold or warm solution of phosphonic acid or derivative thereof in water or in organic or inorganic solvents. The liquid also may be applied by means of rollers. After drying, a test is made to ascertain whether or not the layer contains a portion capable of being washed off.

The material thus prepared is cut into sizes to suit the consumer, specifically into the sizes which correspond to the securing devices on offset printing machines, and then shipped and stored, or stored first and then shipped, and in some cases then stored again. The light-sensitive coating is then applied by the consumer. This is effected with a solution of the light-sensitive material of suitable viscosity. For the application of the solution, immersion, spraying, whirl-coating and wiping processes are customary.

A support material which contains, in addition to the firmly adhering phosphonic acid layer, a portion capable of being washed off with water, must be washed with water before coating. This can be effected with running water, and also by wiping with a sponge which has been soaked with water, or by means of another soft material which is moistened with water. The washing off should be thoroughly performed, in order to also remove with certainty any dust and dirt which may be adhering to the surface of the support material. The firmly adhering layer is not attacked, even in the case of prolonged washing. Of course, aqueous solutions of organic solvents, e.g. of alcohol, may also be used for washing the plate.

The copying lacquers from which the copying coatings are prepared generally consist of a light-sensitive substance, a resinous binder, plasticizers (if desired), a solvent, and sometimes also a sensitizer. As light-sensitive substances, the following are useful:

Aliphatic and aromatic esters, hydrazides and amides of naphthoquinonediazide sulfonic acids, cinnamalmalonic acid, substitution products and functional derivatvies thereof; diazonium salts of aminophenylamine and condensation products thereof with formaldehyde; ortho- and para-quinonediazides of benzene; anthracene and heterocyclic systems, as for example of quinoline, indazole, benzimidazole, fluorene and diphenylene hydroxide; and, further, diazo ketones, unsaturated ketones or ortho- and para-iminoquinonediazides, derivatives or alkylnitronaphthalene sulfonic acids, nitroaldehydes, acenaphthenes, nitrones, stilbenes, azides and diazides, more highly polymeric diazo compounds, as well as condensation products of unsubstituted or substituted diphenylamine-4-diazonium salts with formaldehyde, the condensation products being free from metal salts or not and having been prepared in acid medium. However, substances which change their conductivity under the action of light, such as are used in electrophotography, e.g. oxadiazoles, imidazoles, triazoles, oxazoles, and the like also may be used in the process according to the invention for the self-coating of printing plates.

Solvents, resins, plasticizers, and optionally, sensitizers may be chosen according to requirements known to one skilled in the art.

According to the process of the invention, and, specifically, with the use of the copying material of the invention, even under tropical conditions satisfactory planographic printing plates with excellent water-acceptance in the non-printing areas can be prepared at any time.

A further substantial advantage of the process of the invention (especially when the support material of the invention is used), compared with the hitherto known support materials for the preparation of planographic printing plates by consumers themselves, consists in that practically all known positive and negative working coatings adhere to the phosphonic acid surface and permit long printing runs.

The following examples further illustrate the invention:

Example 1

A mechanically roughened aluminum plate is treated by the immersion process with a 5 percent aqueous solution of polyvinylphosphonic acid at 25° C. and dried with warm air. The aluminum plate thus provided with a phosphonic acid layer can be stored, even under tropical conditions, without the hydrophilic properties thereof being impaired.

The phosphonic acid layer contains a portion capable of being washed off with water.

In order to prepare a light-sensitive, negative-working planographic printing plate, the thus pretreated aluminum plate, after being stored for several weeks or even months, is washed with a water spray and the still moist plate is coated, with one percent by weight aqueous solution of a crude condensate of paraformaldehyde and diphenylamine-4-diazonium chloride, by wiping it over with a pad of cotton. After drying, the planographic printing plate is ready for use. The preparation of the aforesaid crude condensate is described in U.S. Patent No. 3,220,832.

The planographic printing plate thus obtained is exposed under a photographic negative and wiped over with a sponge moistened with water, whereby the coating is removed (developed) in the areas not affected by light. The plate is then wiped over with greasy ink. When this is done, only the image hardened by light in the image areas accepts the ink, but the very hydrophilic phosphonic acid layer in the non-image areas repels the greasy ink. The image of the printing ink can be reinforced in conventional manner with lacquer. It is also possible to perform development and lacquering in one operation with the aid of lacquers such as are described, for example, in German Patents No. 1,143,710 and No. 1,180,869.

The printing plate, after development, inking up, and lacquering, yields long printing runs.

Example 2

A thin aluminum strip which had been electrolytically roughened is drawn through a bath which contains a solution, at a temperature of 80° C., of 5 percent by weight vinylphosphonic acid and 0.1 percent by weight carboxymethylcellulose in water, and dried. The phosphonic acid layer contains a portion capable of being washed off with water.

The aluminum strip thus treated can be shipped and stored without diminution of the hydrophilic properties of the surface. When required, it is cut into sizes and, for the preparation of a positive-working planographic printing plate after it has been wiped over briefly with a moist sponge, it is wiped over, using a pad of cotton, with a light-sensitive solution which contains 2 grams of 4'-[naphthoquinone - (1,2) - diazide-(2)-sulfonylhydroxy-(5)]-2',3'-dihydroxybenzophenone (prepared according to U.S. Patent No. 3,116,465, Example 1), 4 grams of a phenol-formaldehyde novolak, and 0.1 gram of diethylamino-azobenzene in butyl acetate.

To prepare a printing plate, the planographic printing plate thus obtained is exposed under a diapositive, whereby a high-contrast image of the original is formed, and developed with a 5 percent by weight aqueous sodium triphosphate solution. When wiping over with greasy ink is effected, the coating accepts the ink well in the image areas, while the hydrophilic phosphonic acid layer repels the ink in the non-image areas.

Example 3

An aluminum plate is coated on a whirl-coater with a solution of 2 percent by weight of a copolymer of styrene and vinylphosphonic acid and 2 percent by weight of polyvinylphosphonic acid in 10 percent by weight of water and 86 percent by weight of methylglycol, and dried. The phosphonic acid layer adheres firmly and contains a portion which can be washed off with water. The plate can be stored for any desired length of time.

To prepare a planographic printing plate, the aluminum plate is washed with water and then coated, by hand using a pad of cotton, with a 1.5 percent by weight solution of 1-[(4'-methylbenzene-1'-sulfonyl)-imino]-2-(2",5" - dimethylphenylaminosulfonyl)-benzoquinone-(1,4)-diazide-(4), (prepared according to U.S. Patent No. 3,175,906, Example 1) in methylglycol. The plate is then dried. To prepare a printing plate, exposure under a negative is effected and development is performed with a 0.5 percent by weight aqueous solution of trisodium phosphate. The plate is then washed with water and inked up.

Example 4

The same procedure is followed as in Example 3, but there is used, instead of the diazo compound employed therein, benzoquinone - (1,4)-diazide-(4)-2-(N-$\beta$-naphthyl)-sulfonamide (prepared according to U.S. Patent No. 2,754,209, Example 2) in the same concentration and with equally good results.

Example 5

An aluminum plate is immersed for 5 minutes at a temperature of 90° C. in a 10 percent by weight aqueous-ammoniacal solution of 3-aminophenylphosphonic acid, and then dried and stored. The phosphonic acid layer contains a portion capable of being washed off.

To prepare a printing plate, the support material is washed and coated by hand with a 2 percent by weight solution of the ester of naphthoquinone-(1,2)-diazide-(2)-sulfonic acid chloride-(4) and 1-methyl-2-(2'-hydroxyphenyl)-benzimidazole (prepared in accordance with the procedure of Example 1 of U.S. Patent No. 3,050,389) in methylglycol and then dried. After exposure under a negative, development with 2 percent by weight aqueous phosphoric acid and inking up, a printing plate for medium printing runs is obtained.

Example 6

The same procedure is followed as in Example 5, but using, instead of the diazo compound employed therein, the naphthoquinone - (1,2)-diazide-(2)-4-sulfonic acid ester of 7-hydroxy-2-methyl-N-(ethyl)-naphtho-1',2':4,5-imidazole (prepared according to Example 6 of U.S. Patent No. 3,046,116).

Example 7

Electrolytically roughened aluminum is treated with phosphonic acid as described in Example 1, stored, and sensitized with a 2 percent by weight solution of 4'-[naphthoquinone - (1,2) - diazide-(2)-sulfonylhydroxy-(5)]-1'-isooctylbenzene (prepared according to U.S. Patent No. 3,046,121) in ethylglycol. After exposure under exposure under a diapositive and development with a 5 percent by weight aqueous solution of trisodium phosphate, and inking up, a good printing plate is obtained.

It will be obvious to those skilled in the art that many modifications may be made within the scope of the present invention without departing from the spirit thereof, and the invention includes all such modifications.

What is claimed is:

1. In the process for making a light-sensitive planographic printing plate in which an aluminum support is coated with a first layer of a water-soluble organic phosphonic acid or an ester or a salt thereof which first layer includes (1) a portion which adheres firmly to the aluminum support and is incapable of being washed off with water and (2) a portion which is capable of being washed off with water, and a second layer which is light-sensitive, the improvement which comprises storing the support for more than 24 hours after coating it with the first layer and before coating it with the second layer and thoroughly washing off with water the water-soluble portion of the first layer before coating the support with the second layer.

2. A process according to claim 1 in which the organic phosphonic acid is polyvinylphosphonic acid.

3. In the process for making a light-sensitive planographic printing plate in which an aluminum support is coated with a first layer selected from the group consisting of vinylphosphonic acid, polyvinylphosphonic acid, 2-phosphonoethane-1-sulfonic acid, vinyl phosphonic acid monomethyl ester, vinyl phosphonic ethyl ester, 4-chlorophenyl phosphonic acid, 3-amino phenyl phosphonic acid, 4-chloro-3-nitro-phenyl phosphonic acid, 5-nitronaphthalene phosphonic acid, interpolymers of vinyl phosphonic acid and acrylic acid or vinyl acetate, and salts of said phosphonic acids, which first layer includes (1) a portion which adheres firmly to the aluminum support and is incapable of being washed off with water and (2) a portion which is capable of being washed off with water, and a second layer which is light-sensitive, the improvement which comprises storing the support for more than 24 hours after coating it with the first layer and before coating it with the second layer and thoroughly washing off with water the water-soluble portion of the first layer before coating the support with the second layer.

References Cited

UNITED STATES PATENTS

| | | | |
|---|---|---|---|
| 3,220,832 | 11/1965 | Uhlig | 117—75 X |
| 3,224,908 | 12/1965 | Duch et al. | 148—6.15 |
| 3,276,868 | 10/1966 | Uhlig | 96—1.5 |
| 3,293,088 | 12/1966 | Herbst et al. | 148—6.15 |

OTHER REFERENCES

German Auslegeschrift, 1,134,093, Aug. 2, 1962.

RALPH S. KENDALL, Primary Examiner

U.S. Cl. X.R.

96—1; 101—456; 117—34, 75